United States Patent
Kwak et al.

(10) Patent No.: US 8,257,877 B2
(45) Date of Patent: Sep. 4, 2012

(54) STACK FOR MIXED REACTANT FUEL CELL AND MIXED REACTANT FUEL CELL SYSTEM INCLUDING THE SAME

(75) Inventors: Chan Kwak, Suwon-si (KR); Alexey Alexandrovichserov, Suwon-si (KR); Jun-Won Suh, Suwon-si (KR); Si-Hyun Lee, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1408 days.

(21) Appl. No.: 11/707,745

(22) Filed: Feb. 16, 2007

(65) Prior Publication Data

US 2007/0207370 A1 Sep. 6, 2007

(30) Foreign Application Priority Data

Feb. 20, 2006 (KR) .................. 10-2006-0016136

(51) Int. Cl.
*H01M 8/24* (2006.01)
*H01M 2/38* (2006.01)
*H01M 8/10* (2006.01)
*H01M 8/04* (2006.01)

(52) U.S. Cl. ............... 429/456; 429/480; 429/513

(58) Field of Classification Search ............ 429/408, 429/415, 452, 545, 456–459, 462–463, 465–466, 429/467, 469–471, 479–481, 483, 507–508, 429/512–513, 515, 535, 445, 468, 482; 427/115
See application file for complete search history.

(56) References Cited

U.S. PATENT DOCUMENTS

| | | | |
|---|---|---|---|
| 6,663,997 B2 | 12/2003 | Dong et al. | |
| 6,723,464 B2 | 4/2004 | Tabata et al. | |
| 7,335,436 B2 | 2/2008 | Kim et al. | |
| 7,465,511 B2 | 12/2008 | Choi | |
| 7,745,037 B2 | 6/2010 | Matsuo et al. | |
| 2002/0192517 A1 | 12/2002 | Beckmann et al. | |

(Continued)

FOREIGN PATENT DOCUMENTS

CN 1681150 A 10/2005

(Continued)

OTHER PUBLICATIONS

Patent Abstracts of Japan, Publication No. 09-082336; Date of Publication: Mar. 28, 1997; in the name of Himeko Kanekawa et al.

(Continued)

*Primary Examiner* — Barbara Gilliam
*Assistant Examiner* — Claire L Roe
(74) *Attorney, Agent, or Firm* — Christie, Parker & Hale, LLP

(57) ABSTRACT

A stack for a mixed oxidant fuel cell and a mixed oxidant fuel cell system including the stack. The stack includes at least one membrane-electrode assembly that includes a polymer electrolyte membrane, an anode and a cathode disposed on opposite sides of the polymer electrolyte membrane, and an electrode substrate disposed on at least one of the anode or the cathode; and an oxidant supply path and a fuel supply path that penetrate the membrane-electrode assembly. The oxidant supply path has both ends open, and the fuel supply path has one end open and the other end closed. The stack of the present invention can improve fuel cell efficiency by smoothly supplying a fuel and an oxidant. Particularly, since the stack is configured to supply the fuel and the oxidant without using a pump, it can make a fuel cell small and light.

16 Claims, 2 Drawing Sheets

U.S. PATENT DOCUMENTS

| | | |
|---|---|---|
| 2003/0165727 A1 | 9/2003 | Priestnall et al. |
| 2005/0074656 A1 | 4/2005 | Koyama et al. |
| 2005/0084737 A1 | 4/2005 | Wine et al. |
| 2005/0089743 A1 | 4/2005 | Lee |
| 2005/0130010 A1 | 6/2005 | Choi |
| 2005/0170227 A1 | 8/2005 | Corey et al. |
| 2005/0202300 A1 | 9/2005 | Poirot-Crouvezier |
| 2005/0287418 A1 | 12/2005 | Noh et al. |

FOREIGN PATENT DOCUMENTS

| | | |
|---|---|---|
| CN | 1703798 A | 11/2005 |
| DE | 10 2005 010 039 A1 | 9/2005 |
| GB | 2 412 005 A | 9/2005 |
| JP | 9-82336 | 3/1997 |
| JP | 2003-272697 | 9/2003 |
| JP | 2003-288918 | 10/2003 |
| JP | 2003-297391 | 10/2003 |
| JP | 2004-500691 | 1/2004 |
| JP | 2004-501480 | 1/2004 |
| JP | 2005-108849 | 4/2005 |
| JP | 2005-108850 | 4/2005 |
| JP | 2004-146265 | 5/2005 |
| JP | 2005-129518 | 5/2005 |
| JP | 2002-313360 | 10/2005 |
| JP | 2007-220680 | 8/2007 |
| KR | 2001-0075356 | 8/2001 |
| KR | 2003-0066319 | 8/2003 |
| KR | 10-2004-0069147 | 8/2004 |
| KR | 10-2005-0036394 | 4/2005 |
| KR | 10-2005-0090876 | 9/2005 |
| WO | WO 00/19555 | 4/2000 |
| WO | WO 01/73881 A1 | 10/2001 |
| WO | WO 01/78179 A1 | 10/2001 |
| WO | WO 2004/034495 A1 | 4/2004 |

OTHER PUBLICATIONS

Patent Abstracts of Japan, Publication No. 2003-297391; Date of Publication: Oct. 17, 2003; in the name of Ryoichi Okuyarna et al.

European Search Report dated Feb. 17, 2009 for corresponding European application No. EP 07 102 669.4-2119, noting references listed in this IDS.

Frano Barbir, *PEM Fuel Cells: Theory & Practice*, Academic Press Sustainable World Series, Jul. 2005.

Ulf Bossel, *Efficiency of Hydrogen Fuel Cell, Diesel-SOFC-Hybrid and Battery Electric Vehicles*, European Fuel Cell Forum, Oct. 20, 2003, 4 pages.

Dumercy, et al, *PEFC Stack Operating in Anodic Dead End Mode*, results presented at 2nd European PEFC Forum, Jul. 2003, Lucerne, Switzerland.

Priestnall, M. et al., *Compact mixed-reactant fuel cells*, Journal of Power Sources, vol. 106, pp. 21-30, published (2002).

European Search Report dated Jun. 18, 2007, for 07102669.4, in the name of Samsung SDI Co., Ltd.

U.S. Office action dated Jan. 22, 2010, for related U.S. Appl. No. 11/707,469.

Japanese Office action dated Aug. 10, 2010, for corresponding Japanese Patent application 2007-024551, noting listed references in this IDS.

European Search Report dated May 29, 2007, for corresponding European application 07102505.0, noting U.S. references.

U.S. Office action dated Jul. 15, 2009, for related U.S. Appl. No. 11/707,469, noting U.S. Patent 6,723,464 and U.S. Publication 2005/0287418, and Japan 2003-297391 listed in this IDS.

Korean Patent Abstracts, Publication No. 1020040069147, dated Aug. 4, 2004, in the name of Naotake Kawamura et al.

Korean Patent Abstracts, Publication No. 1020050036394, dated Apr. 20, 2005, in the name of Byung Sun Hong et al.

Korean Patent Abstracts, Publication No. 1020050090876, dated Sep. 14, 2005, in the name of Ho Suk Kim et al.

Patent Abstracts of Japan and English machine translation for Japanese Publication 2004-146265 listed above.

Japanese Office action dated Sep. 28, 2010, for corresponding Japanese Patent application 2007-034950, noting listed Japanese references in this IDS.

U.S. Office action dated Nov. 17, 2010, for cross reference U.S. Appl. No. 11/783,388, noting listed reference in this IDS.

STACK FOR MIXED REACTANT FUEL CELL AND MIXED REACTANT FUEL CELL SYSTEM INCLUDING THE SAME

CROSS-REFERENCE TO RELATED APPLICATION

This application claims priority to and the benefit of Korean Patent Application No. 10-2006-0016136, filed in the Korean Intellectual Property Office on Feb. 20, 2006, the entire content of which is incorporated herein by reference.

FIELD OF THE INVENTION

The present invention relates to a stack for a mixed reactant fuel cell and a mixed reactant fuel cell system including the same.

BACKGROUND OF THE INVENTION

A fuel cell is a power generation system for producing electrical energy through an electrochemical redox reaction of an oxidant and hydrogen in a hydrocarbon-based material such as methanol, ethanol, or natural gas.

Representative exemplary fuel cells include a polymer electrolyte membrane fuel cell (PEMFC) and a direct oxidation fuel cell (DOFC). The direct oxidation fuel cell includes a direct methanol fuel cell, which uses methanol as a fuel.

The polymer electrolyte fuel cell has an advantage of a high energy density, but it also has problems in the need to carefully handle hydrogen gas and the requirement of accessory equipment such as a fuel reforming processor for reforming methane or methanol, natural gas, and the like in order to produce hydrogen as the fuel gas.

In comparison, a direct oxidation fuel cell has a lower energy density than that of the polymer electrolyte fuel cell, but it has the advantages of easy handling of a fuel, being capable of operating at a room temperature due to its low operating temperature, and no need for additional fuel reforming processors.

The above information disclosed in this Background section is only for enhancement of understanding of the background of the invention, and therefore it may contain information that does not form the prior art that is already known in this country to a person of ordinary skill in the art.

SUMMARY OF THE INVENTION

One embodiment of the present invention provides a stack for a mixed reactant fuel cell that can improve the fuel cell performance due to smooth diffusion of a fuel and an oxidant into an electrode.

Another embodiment of the present invention provides a mixed reactant fuel cell system including the stack.

According to one embodiment of the present invention, a stack for a mixed reactant fuel cell includes: at least one membrane-electrode assembly including a polymer electrolyte membrane; an anode and a cathode disposed at opposite sides of the polymer electrolyte membrane; and an electrode substrate disposed on at least one of the anode or the cathode.

The present invention, in one embodiment, also provides a fuel cell system including the stack and a fuel supplier connected to the stack and supplying fuel.

The stack, in one embodiment, includes an oxidant supply path and a fuel supply path that penetrate the membrane-electrode assembly. Both ends of the oxidant supply path are open, and one end of the fuel supply path is closed, and the other end is open. When the fuel cell system is prepared by using the stack, in one embodiment, the open end of the fuel supply path is connected to the fuel supplier, and the other end of the fuel supply path is closed in the fuel cell system. In this embodiment, both ends of the fuel supply path are closed to the outside.

DETAILED DESCRIPTION

Figure 1:
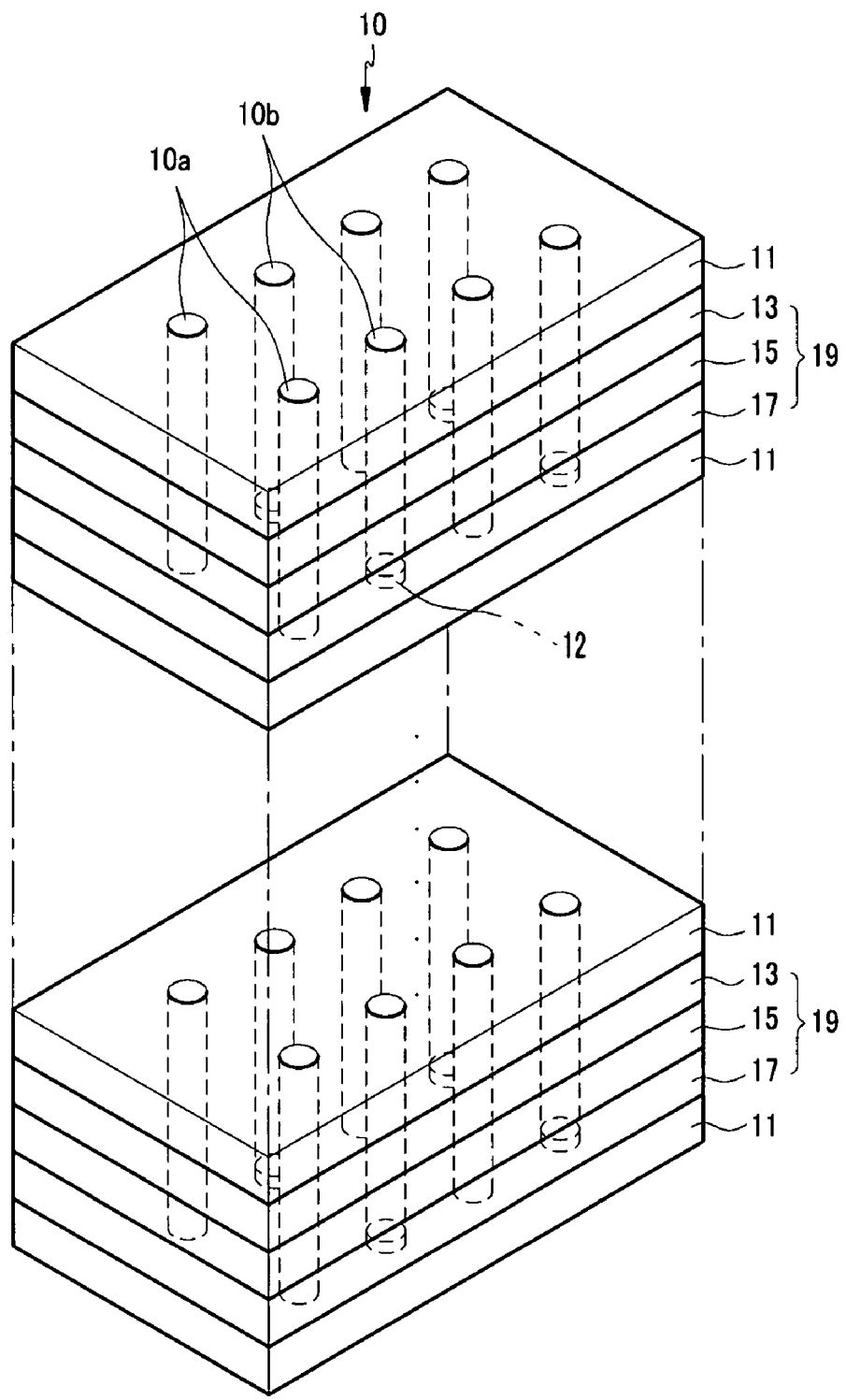
FIG. 1 is a perspective view showing a stack for a mixed reactant fuel cell according to one embodiment of the present invention.

Exemplary embodiments of the present invention will hereinafter be described in detail with reference to the accompanying drawings.

The present invention, in one embodiment, provides a stack for a mixed reactant fuel cell. Particularly, the present invention, in one embodiment, provides a stack for a passive type fuel cell, or an air-breathing type fuel cell. Since the passive type fuel cell is appropriate for direct oxidation using hydrocarbon fuel, the stack in one embodiment of the present invention is suitable for a passive type direct oxidation mixed reactant fuel cell.

The mixed reactant fuel cell according to one embodiment of the present invention includes one catalyst for selectively activating the oxidation reaction of the fuel at the anode and another catalyst for selectively activating the reduction reaction of the oxidant at the cathode. Therefore, when the mixture of the fuel and the oxidant is injected into both the anode and the cathode, only an oxidation reaction of the fuel is carried out at the anode and only a reduction reaction of the oxidant is carried out at the cathode.

The structure of the mixed reactant fuel cell according to one embodiment of the present invention is substantially the same as that of a conventional mixed reactant fuel cell. However, the mixed reactant fuel cell in one embodiment of the present invention does not inject a mixture of a fuel and an oxidant but rather injects a fuel and an oxidant individually or separately (e.g., in a crossing direction) such that the fuel and the oxidant are mixed in a stack.

By way of example, the mixed reactant fuel cell in one embodiment of the present invention does not require separators that are needed to isolate each membrane-electrode assembly in conventional fuel cells. Further, the fuel cell according to the described embodiment does not need to take into account the cross-over of a fuel. Therefore, the mixed reactant fuel cell in one embodiment of the present invention can significantly reduce production costs for a fuel cell and reduce the size of a fuel cell. Also, the present invention, according to one embodiment, can resolve the problem associated with supplying fuel and air in the conventional mixed reactant fuel cell that injects a mixture of a fuel and an oxidant, by forming an oxidant supply path.

Also, since the mixed reactant fuel cell in one embodiment of the present invention does not include bipolar plates that supply fuel and an oxidant in a conventional fuel cell, a new method for supplying a fuel and an oxidant is provided.

A mixed reactant fuel cell stack according to one embodiment of the present invention includes at least one membrane-electrode assembly including a polymer electrolyte membrane, an anode and a cathode disposed on opposite sides of the polymer electrolyte membrane, and an electrode substrate disposed on one side of at least one of the cathode or the anode. The mixed reactant fuel cell stack also includes an oxidant supply path and a fuel supply path.

The polymer electrolyte membrane, the anode, the cathode, and the electrode substrate may be porous to transfer the fuel and spread the oxidant supplied through the oxidant supply path.

The oxidant supply path penetrates at least one membrane-electrode assembly, and both ends of the oxidant supply path are open. The fuel supply path has one end open and the other end closed. The oxidant supply path and the fuel supply path may be formed alternately in a single row, or they may be formed separately in different rows. The number of oxidant supply paths may be the same as the number of fuel supply paths, or it may be different, for example, two oxidant supply paths and one fuel supply path. The oxidant supply path and the fuel supply path may be formed in different rows and arranged alternately to each other.

The oxidant is easily input to the inside of the membrane-electrode assembly through both ends of the oxidant supply path and spread in the entire membrane-electrode assembly through the porous anode, cathode, polymer electrolyte membrane, and electrode substrate. Since the oxidant is input to the inside of the stack through the oxidant supply path and spread in the entire stack through the pores, mass transfer resistance is considerably reduced, and the oxidant can be smoothly supplied and spread.

As described above, since both ends of the oxidant supply path are open and exposed to air, the oxidant can be supplied to the stack by a pressure difference, rather than using a pump.

The area of a cross-section of the oxidant supply path perpendicular to the path propagation direction may range from 1 $mm^2$ to 20 $mm^2$, and more specifically, from 1.5 $mm^2$ to 3 $mm^2$. In one embodiment, when the cross-sectional area is larger than 20 $mm^2$, a ratio of an external area of the oxidant supply path to the volume of the oxidant supply path is so small that a fuel supply efficiency is deteriorated. In the described embodiment, when the cross-sectional area is smaller than 1 $mm^2$, the oxidant cannot be easily supplied to the oxidant supply path.

The fuel supply path penetrates at least one membrane-electrode assembly, and has one end open and the other closed. Fuel is easily input into the stack through the open end of the fuel supply path and spread to the entire membrane-electrode assembly through the pores of the porous anode, cathode, polymer electrolyte membrane, and electrode substrate. As described above, since the fuel is input to the inside of the stack through the fuel supply path and then spread to the entire stack through the pores, mass transfer resistance is considerably reduced, and the fuel can be smoothly supplied and spread.

One end of the fuel supply path is closed by a closing material. The closing material prevents the fuel from being lost through the other end of the pores when the fuel is input through one end of the pores, and it contributes to supplying the fuel as much as is used in the stack. Non-limiting examples of the closing material include acryl resin and Teflon® (tetrafluoroethylene). Also, the closing material may be disposed only in an area where the fuel supply path is in one side of the stack composed of at least one membrane-electrode assembly, or it may be disposed in the entire surface of a side of the stack except the part where the oxidant supply path is.

One end of the fuel supply path is connected to a fuel tank such that the fuel can be supplied to the stack by gravity or a capillary phenomenon without using a pump.

The area of a cross-section perpendicular to the path propagation direction of the fuel supply path, in one embodiment, may range from 1 $mm^2$ to 5 $mm^2$, and more specifically from 1 $mm^2$ to 2 $mm^2$. In the described embodiment, when the cross-sectional area is larger than 5 $mm^2$, a ratio of an external area of the fuel supply path to the volume of the fuel supply path occupied in the stack is so small that the performance of the stack is deteriorated, while when the cross-sectional area is smaller than 1 $mm^2$, fuel cannot be smoothly supplied to the stack through the fuel supply path.

The volume of the fuel supply path occupied in the stack, in one embodiment, may range from 10% to 20%. In the described embodiment, when the fuel supply path occupies more than 20% of the stack, the area of a fuel cell catalyst reaction is reduced, while when it occupies less than 10% of the stack, fuel is not supplied smoothly.

The oxidant supply path and the fuel supply path may be formed by stacking at least one membrane-electrode assembly, disposing the closing material at one side of the outermost membrane-electrode assembly, and punching the stack. However, the methods for forming the oxidant supply path and the fuel supply path are not limited thereto. In one embodiment, one end of the fuel supply path is closed by the closing material.

The stack for a mixed reactant fuel cell according to one embodiment of the present invention can be provided with the fuel and the oxidant without a pump, and can be efficiently applied to small and light fuel cells.

An anode catalyst layer includes a catalyst for selectively activating the oxidation reaction of fuel. An example of the catalyst is a platinum-ruthenium alloy catalyst. However, the catalyst is not limited thereto.

The cathode catalyst layer, in one embodiment, may include any catalyst for selectively activating an oxidant reduction reaction. Specifically, the catalyst, according to one embodiment, is selected from the group consisting of Fe-tetraphenylporphyrin (Fe-TPP), Co-tetraphenylporphyrin, (Co-TPP), Fe-tetramethoxyphenyl porphyrin (Fe-TMPP), Co-tetramethoxyphenylporphyrin (Co-TMPP), Fe-phthalocyanine (Fe—PC), Co-phthalocyanine (Co—PC), Ru—S, Ru—Se, Ru—Mo—S, Ru—Mo—Se, Ru—W—S, Ru—W—Se, and a combination thereof. The catalyst has high activity and selectivity for an oxidant reduction reaction.

The catalyst selected from Fe-tetraphenylporphyrin (Fe-TPP), Co-tetraphenylporphyrin, (Co-TPP), Fe-tetramethoxyphenyl porphyrin (Fe-TMPP), Co-tetramethoxyphenylporphyrin (Co-TMPP), Fe-phthalocyanine (Fe—PC), or Co-phthalocyanine (Co—PC) is subjected to the heat-treatment to show excellent catalytic activity, in one embodiment.

Catalysts included in the anode catalyst layer and the cathode catalyst layer may be used in a form of a metal itself (black catalyst) or can be used while being supported on a carrier.

The carrier may include a carbon-based material such as acetylene black, denka black, activated carbon, ketjen black, or graphite, or an inorganic particulate such as alumina, silica, zirconia, or titania. The carbon-based material is generally used in the art.

The cathode and anode catalyst layers may include a binder that is generally used in a catalyst layer of a fuel cell. Non-limiting examples of the binder include polytetrafluoroethylene, polyvinylidenefluoride, polyvinylidene chloride, polyvinyl alcohol, cellulose acetate, poly (perfluorosulfonic acid), and so on.

The polymer electrolyte membrane, in one embodiment, plays a role of exchanging ions by transferring the protons produced from an anode catalyst layer to a cathode catalyst layer, and is made of a high proton conductive polymer.

The proton conductive polymer may be a polymer resin having a cation exchange group selected from the group consisting of a sulfonic acid group, a carboxylic acid group, a phosphoric acid group, a phosphonic acid group, and derivatives thereof, at its side chain.

Non-limiting examples of the polymer resin include at least one proton conductive polymer selected from the group consisting of fluoro-based polymers, benzimidazole-based polymers, polyimide-based polymers, polyetherimide-based polymers, polyphenylenesulfide-based polymers, polysulfone-based polymers, polyethersulfone-based polymers, polyetherketone-based polymers, polyether-etherketone-based polymers, and polyphenylquinoxaline-based polymers. In an exemplary embodiment, the proton conductive polymer is at least one selected from the group consisting of poly(perfluorosulfonic acid), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bibenzimidazole), or poly (2,5-benzimidazole). The thickness of the polymer electrolyte membrane, in one embodiment, may range from 10 µm to 200 µm. The crossover of the fuel does not cause problems in the mixed reactant fuel cell, but, in one embodiment, the thickness of the polymer electrolyte membrane is between 10 µm and 100 µm in order to increase the proton conductivity.

The electrode substrate plays a role to support a catalyst layer to diffuse the fuel and the oxidant into the electrodes. This way, the fuel and the oxidant are easily contacted to the electrodes. In one embodiment, the electrode substrate is formed from a material such as carbon paper, carbon cloth, carbon felt, or a metal cloth (a porous film composed of metal fiber or a metal film disposed on a surface of a cloth composed of polymer fibers). The electrode substrate is not limited thereto.

FIG. 1 is a perspective view showing a stack for a mixed reactant fuel cell according to one embodiment of the present invention.

The stack 10 is composed of at least one membrane-electrode assembly 19 that includes a polymer electrolyte membrane 15, an anode 13 and a cathode 17 disposed on opposite sides of the polymer electrolyte membrane 15, and an electrode substrate 11 disposed on the anode 13.

The stack also includes an oxidant supply path 10a that penetrates the electrode substrate 11, the anode 13, the polymer electrolyte membrane 15, and the cathode 17 and has its both ends open, and a fuel supply path 10b that penetrates the electrode substrate 11, the anode 13, the polymer electrolyte membrane 15, and the cathode 17, and has one end open. The other end of the fuel supply path 10b is closed with a closing material 12. The oxidant is supplied to the inside of the stack 10 through both open ends, and it is spread to the entire stack 10 through pores connected to the oxidant supply path 10a. Also, the fuel is supplied to the inside of the stack 10 through an end of the fuel supply path 10b and is spread to the entire stack 10 through pores connected to the fuel supply path 10b to be thereby supplied to the anode 13 and the cathode 17.

Both the fuel and the oxidant are supplied to the anode 13 and the cathode 17. However, since the anode 13 includes a catalyst for selectively activating the fuel oxidation reaction, only the fuel oxidation reaction occurs. Also, since the cathode 17 includes a catalyst for selectively activating the oxidant reduction reaction, only the oxidant reduction reaction occurs. Protons generated from the fuel oxidation reaction are transferred from the anode 13 to the cathode 17 through the polymer electrolyte membrane 15 and react with electrons and the oxidant transferred from the anode of an adjacent membrane-electrode assembly, and produce water and electricity.

One embodiment of the present invention also provides a mixed reactant fuel cell system. The mixed reactant fuel cell system includes the stack according to one embodiment of the present invention that is described above, and a fuel supplier.

The fuel supplier includes a fuel tank for storing fuel and supplying the fuel to the stack, and it may further include a fuel suction part (or fuel suction mechanism) to better supply the fuel to the stack. The fuel suction part sucks in the fuel from the fuel tank and supplies the fuel to the stack. As for the fuel suction, any material chemically stable for fuel may be used, such as glass fiber.

The mixed reactant fuel cell system of one embodiment of the present invention may be used for a direct oxidation fuel cell using liquid-type hydrocarbon fuel, specifically, for a direct methanol fuel cell. Examples of the hydrocarbon fuel include methanol, ethanol, propanol, butanol, and natural gas.

Figure 2:
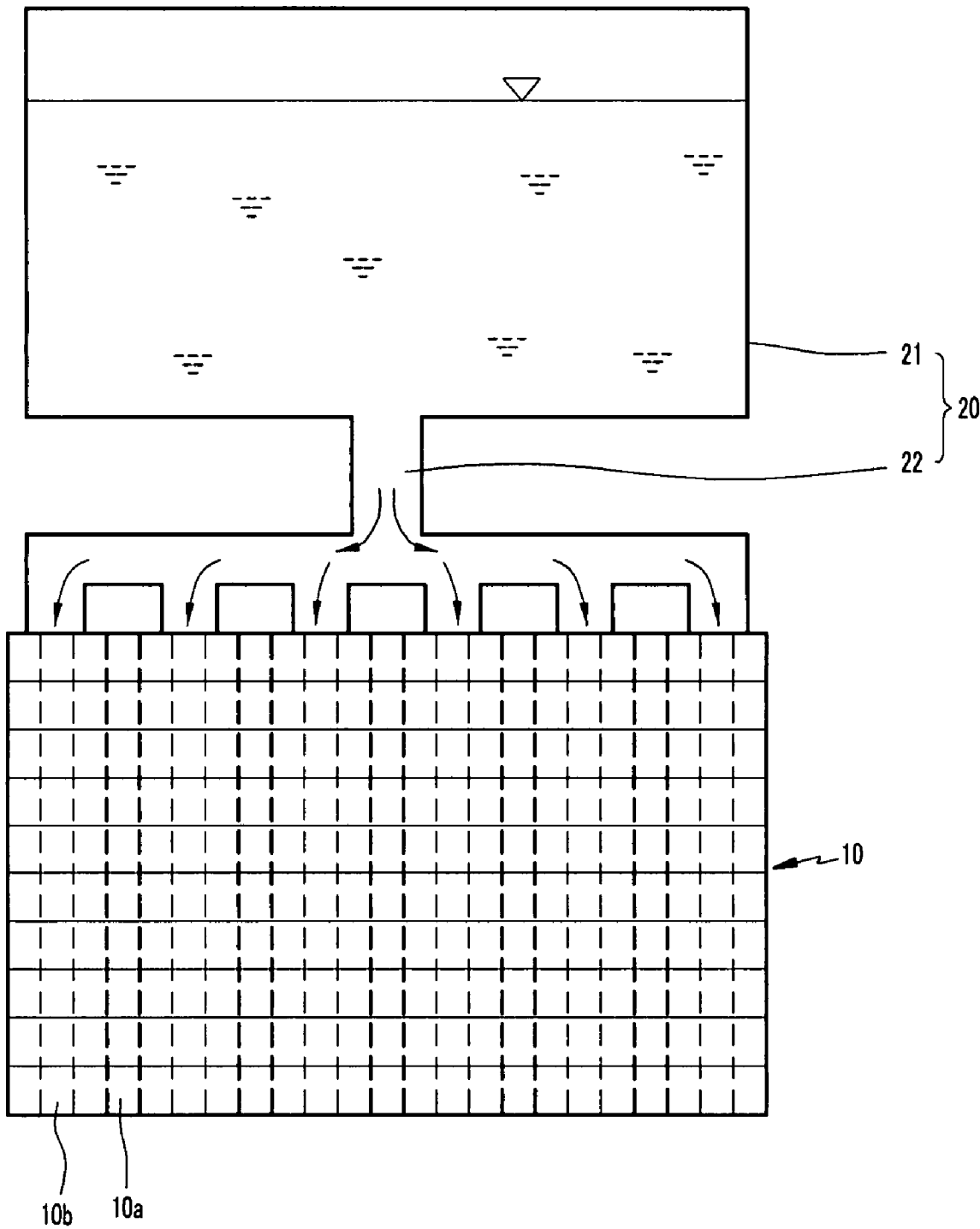
FIG. 2 is a schematic view showing a mixed reactant fuel cell system according to an embodiment of the present invention.

FIG. 2 is a schematic view showing a mixed reactant fuel cell system according to an embodiment of the present invention. The mixed reactant fuel cell system will be described in detail with reference to FIG. 2.

The mixed reactant fuel cell system includes a stack 10 and a fuel supplier 20 that supplies the fuel to the stack 10.

The fuel supplier 20 includes a fuel tank 21 for storing fuel and a fuel suction (or fuel suction part) 22 connected to the fuel tank 21. The fuel in the fuel tank 21 is supplied to the stack 10 by gravity. The fuel suction 22 is optionally set up in the mixed oxidant fuel cell system to better supply the fuel from the fuel tank 21 to the stack 10. The fuel suction 22 includes a fuel suction material such as glass fiber, and transfers the fuel stored in the fuel tank 21 to the stack 10.

An oxidant is supplied through an oxidant supply path 10a without an additional oxidant tank or an oxidant pump, and the oxidant supply path 10a is exposed to air to input air to the stack.

The fuel and the oxidant are input to the inside of the stack 10 through the oxidant supply path 10a and the fuel supply path 10b, spread to the entire stack 10 through the pores of the cathode, anode, polymer electrolyte membrane, and electrode substrate, and are involved in the fuel oxidation reaction in the anode and the oxidant reduction reaction in the cathode.

As shown in FIGS. 1 and 2, one end of the fuel supply path is closed and the other end is open and connected to the fuel tank 21 through the fuel suction 22 to be supplied with the fuel.

The following examples illustrate embodiments of the present invention in more detail. However, it is understood that the present invention is not limited by these examples.

Example 1

A cathode catalyst slurry was prepared by mixing Fe-tetraphenylporphyrin (Fe-TPP) 0.34 g, which was obtained from a heat treatment performed in an atmosphere of argon gas at 750° C. for 4 hours, 5 wt % polyperfluorosulfonate binder 2.08 g, and 7.4 ml solvent mixture of isopropyl alcohol and water prepared at a mixing ratio of 9:1. A carbon paper electrode substrate was coated with the catalyst slurry to thereby form a cathode on the electrode substrate.

An anode catalyst slurry was prepared by mixing platinum-ruthenium black 0.34 g, polyperfluorosulfonate binder 2.08 g, and 7.4 ml solvent mixture of isopropyl alcohol and water prepared at a mixing ratio of 9:1. Another carbon paper electrode substrate was coated with the anode catalyst slurry to thereby form an anode on the electrode substrate.

A Nafion® (perfluorosulfonic acid) polymer electrolyte membrane was disposed on each of the anode and the cathode formed in the electrode substrate and hot-pressed at 125° C. at a pressure of 200 kgf/cm$^2$ for 3 minutes to thereby produce a membrane-electrode assembly, which was used as a unit cell. An oxidant supply path having a cross-sectional area of 2 mm$^2$ and a fuel supply path having a cross-sectional area of 1 mm$^2$ were formed in the unit cell by punching the membrane-electrode assembly.

A stack was fabricated by stacking the membrane-electrode assembly. Both ends of the oxidant supply path were left open, and one end of the fuel supply path was left open and the other end was closed with Teflon® (tetrafluoroethylene).

The fuel cell system using the stack has an advantage in that it typically has a small volume compared to a conventional fuel cell system of the same power output.

The stack for a mixed reactant fuel cell in one embodiment according to the present invention can improve fuel cell efficiency by smoothly supplying fuel and an oxidant through diffusion. Particularly, since the stack is configured to supply the fuel and the oxidant without using a pump, it can make a fuel cell small and light.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims and their equivalents.

What is claimed is:

1. A stack for a mixed reactant fuel cell, comprising:
   at least one membrane-electrode assembly comprising a polymer electrolyte membrane, an anode and a cathode disposed on opposite sides of the polymer electrolyte membrane, and an electrode substrate disposed on at least one of the anode or the cathode; and
   a plurality of oxidant supply paths extending through the at least one membrane-electrode assembly in a first direction and a plurality of fuel supply paths alternating with the oxidant supply paths, the oxidant supply paths and the fuel supply paths penetrating the at least one membrane-electrode assembly,
   wherein each oxidant supply path of the plurality of oxidant supply paths has openings at opposite ends of the oxidant supply path in the first direction, each of the openings being configured to supply oxidant to the at least one membrane-electrode assembly, and each fuel supply path of the plurality of fuel supply paths has one end open and the other end closed.

2. The stack of claim 1, wherein an area of a cross-section of at least one oxidant supply path perpendicular to a path propagation direction ranges from 1 mm$^2$ to 20 mm$^2$.

3. The stack of claim 2, wherein the area of the cross-section of the at least one oxidant supply path perpendicular to the path propagation direction ranges from 1.5 mm$^2$ to 3 mm$^2$.

4. The stack of claim 1, wherein an area of a cross-section of at least one fuel supply path perpendicular to a path propagation direction ranges from 1 mm$^2$ to 5 mm$^2$.

5. The stack of claim 4, wherein the area of the cross-section of the at least one fuel supply path perpendicular to the path propagation direction ranges from 1 mm$^2$ to 2 mm$^2$.

6. The stack of claim 1, wherein at least one fuel supply path occupies 10% to 20% of the at least one membrane-electrode assembly.

7. The stack of claim 1, wherein the polymer electrolyte membrane, the anode and the cathode have pores for distributing fuel and the oxidant in the at least one membrane-electrode assembly by diffusion.

8. A mixed reactant fuel cell system, comprising:
   a stack comprising at least one membrane-electrode assembly comprising a polymer electrolyte membrane, an anode and a cathode disposed on opposite sides of the polymer electrolyte membrane, and an electrode substrate disposed on at least one of the anode or the cathode;
   a plurality of oxidant supply paths extending through the at least one membrane-electrode assembly in a first direction and a plurality of fuel supply paths alternating with the oxidant supply paths, the oxidant supply paths and the fuel supply paths penetrating the at least one membrane-electrode assembly, wherein each oxidant supply path of the plurality of oxidant supply paths has openings at opposite ends of the oxidant supply path in the first direction, each of the openings being configured to supply oxidant to the at least one membrane-electrode assembly, and each fuel supply path of the plurality of fuel supply paths has one end open and the other end closed; and
   a fuel supplier for supplying fuel to the stack through the open end of each fuel supply path.

9. The mixed reactant fuel cell system of claim 8, wherein an area of a cross-section of at least one oxidant supply path perpendicular to a path propagation direction ranges from 1 mm$^2$ to 20 mm$^2$.

10. The mixed reactant fuel cell system of claim 9, wherein the area of the cross-section of the at least one oxidant supply path perpendicular to the path propagation direction ranges from 1.5 mm$^2$ to 3 mm$^2$.

11. The mixed reactant fuel cell system of claim 8, wherein an area of a cross-section of at least one fuel supply path perpendicular to a path propagation direction ranges from 1 mm$^2$ to 5 mm$^2$.

12. The mixed reactant fuel cell system of claim 11, wherein the area of the cross-section of the at least one fuel supply path perpendicular to the path propagation direction ranges from 1 mm$^2$ to 2 mm$^2$.

13. The mixed reactant fuel cell system of claim 8, wherein at least one fuel supply path occupies 10% to 20% of the at least one membrane-electrode assembly.

14. The mixed reactant fuel cell system of claim 8, further comprising a fuel suction part for supplying the fuel from the fuel supplier to the stack.

15. The mixed reactant fuel cell system of claim 8, wherein the mixed reactant fuel cell system comprises a direct oxidation fuel cell.

16. The mixed reactant fuel cell system of claim 8, wherein the polymer electrolyte membrane, the anode and the cathode have pores for distributing the fuel and the oxidant in the at least one membrane-electrode assembly by diffusion.

* * * * *